US009327577B2

(12) United States Patent  
Lombardo et al.

(10) Patent No.: US 9,327,577 B2  
(45) Date of Patent: May 3, 2016

(54) VEHICLE HEAT PUMP SYSTEM AND METHOD UTILIZING THERMAL STORAGE

(71) Applicant: GM GLOBAL TECHNOLOGY OPERATIONS LLC, Detroit, MI (US)

(72) Inventors: Paul S. Lombardo, Commerce Township, MI (US); Lawrence P. Ziehr, Clarkston, MI (US); Brian P. Lemon, Plymouth, MI (US); Mark D. Nemesh, Troy, MI (US); Bryan M. Styles, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 13/750,421

(22) Filed: Jan. 25, 2013

(65) Prior Publication Data

US 2014/0208789 A1 Jul. 31, 2014

(51) Int. Cl.
*B60H 1/00* (2006.01)
*F25B 5/02* (2006.01)
*F25B 6/02* (2006.01)
*F25B 25/00* (2006.01)

(52) U.S. Cl.
CPC ........ *B60H 1/00007* (2013.01); *B60H 1/00278* (2013.01); *B60H 1/00899* (2013.01); *F25B 5/02* (2013.01); *F25B 6/02* (2013.01); *B60H 1/00807* (2013.01); *B60H 2001/00949* (2013.01); *F25B 25/005* (2013.01); *F25B 2339/047* (2013.01); *F25B 2341/0662* (2013.01); *F25B 2400/24* (2013.01)

(58) Field of Classification Search
CPC ........... B60H 1/00007; B60H 1/00278; B60H 1/00807; B60H 2001/00949; F25B 2400/24; F25B 6/02; F25B 25/005; F25B 2339/047; F25B 2341/0662; F25B 5/02

USPC ............ 165/64; 62/238.6, 238.1, 238.7, 430, 62/333

See application file for complete search history.

(56) References Cited

U.S. PATENT DOCUMENTS

| 4,233,960 A  * | 11/1980 | Johnson ......................... 126/572 |
| 5,291,960 A  * | 3/1994 | Brandenburg et al. .... 180/65.27 |
| 6,862,892 B1 * | 3/2005 | Meyer et al. .................... 62/115 |
| 2005/0167169 A1* | 8/2005 | Gering et al. ................. 180/65.2 |
| 2005/0210903 A1* | 9/2005 | Allen .............................. 62/244 |

(Continued)

FOREIGN PATENT DOCUMENTS

| CN | 102856609 A | 1/2013 |
| DE | 102009019607 A1 | 11/2010 |

(Continued)

*Primary Examiner* — Ljiljana Ciric
*Assistant Examiner* — Kirstin Oswald
(74) *Attorney, Agent, or Firm* — Quinn Law Group, PLLC

(57) ABSTRACT

A heat pump system, including a thermal storage medium, for use in a vehicle having a passenger compartment, and a corresponding method for providing heat to a vehicle passenger compartment. The vehicle may have an electric only vehicle mode wherein the vehicle may occupy one of an active electric drive state and an inactive state. The heat pump system may include a thermal storage medium configured to store heat produced during the inactive state. The thermal storage medium may be a device which has a thermal capacity exchangeable with a fluid medium such as an Rechargeable Energy Storage System (RESS) or a phase change material. The heat stored by the thermal storage medium during the vehicle charge event may be transmitted from the thermal storage medium to the passenger compartment via the heat pump system during the active electric drive state.

17 Claims, 2 Drawing Sheets

(56) References Cited

U.S. PATENT DOCUMENTS

| | | |
|---|---|---|
| 2007/0175230 A1* | 8/2007 | Plummer et al. ............ 62/236 |
| 2009/0031749 A1* | 2/2009 | Nishikawa et al. ......... 62/324.3 |
| 2010/0012295 A1* | 1/2010 | Nemesh et al. ......... 165/104.19 |
| 2012/0082871 A1* | 4/2012 | Simonini et al. ............. 429/50 |
| 2012/0090806 A1 | 4/2012 | Beschieru et al. |
| 2012/0327596 A1 | 12/2012 | Anderson-Straley et al. |

FOREIGN PATENT DOCUMENTS

| | | |
|---|---|---|
| DE | 102010048853 A1 | 4/2012 |
| EP | 2258571 A1 | 12/2010 |
| GB | 2125156 A | 2/1984 |
| GB | 2289976 A | 12/1995 |
| KR | 20070027902 A | 3/2007 |

* cited by examiner

VEHICLE HEAT PUMP SYSTEM AND METHOD UTILIZING THERMAL STORAGE

TECHNICAL FIELD

The disclosure relates to a vehicle heat pump system and method, which utilizes thermal storage to provide heat to the vehicle passenger compartment.

BACKGROUND

Hybrid electric vehicles selectively use an internal combustion engine as a source of input torque to a transmission, alone or in conjunction with the traction motor(s), while extended-range electric vehicles (EREV) use a smaller engine only when needed, and solely to power an electric generator. Battery electric vehicles forego use of the small gas engine, and instead operate using stored electrical energy or regenerative braking energy. All three vehicle configurations can operate solely on electricity in what is referred to as an electric vehicle (EV) mode.

In some of the above vehicle embodiments, a Rechargeable Energy Storage System (RESS) is used to alternatively store and deliver the substantial amounts of electrical energy needed for driving the fraction motor(s). The RESS may consist of a battery pack having multiple battery modules each containing multiple cylindrical or flat/tabular battery cells. The battery pack generates heat in operation. Effectively dissipating the generated heat is essential to optimizing vehicle performance. As a result, thermal management systems are used in conjunction with battery packs to circulate a volume of a suitable cooling fluid through the battery pack and any associated power electronics and to circulate another suitable cooling fluid through an active cooling circuit to control the temperature of the passenger compartment.

SUMMARY

In such systems, the possibility exists to exchange heat from the Rechargeable Energy Storage System (RESS) or other thermal storage component to another medium. This heat exchange allows for the storage of heat during a vehicle charge event and moving that stored heat into the passenger compartment through the active cooling system, allowing for a more efficient heat pump system in colder ambient temperatures.

Thus, a heat pump system for use in a vehicle having a passenger compartment, and a battery pack is provided. The vehicle may have an active electric drive state in EV mode and an inactive state. The heat pump system may include a thermal storage medium configured to store heat produced during the inactive state and/or heat actively added using a heater. The heat stored by the thermal storage medium during the vehicle charge event may be transmitted from the thermal storage medium to the passenger compartment via the heat pump system during the active electric drive state, which includes cabin pre-conditioning prior to driving.

The heat pump system may further include a first coolant circuit, a refrigeration circuit, and a second coolant circuit. The first coolant circuit may be configured to circulate a first coolant to absorb heat from a thermal storage medium, which has a thermal capacity exchangeable with a fluid medium. The refrigeration circuit may be configured to circulate refrigerant to absorb heat from the first coolant via a first heat exchanger. The second coolant circuit may be configured to circulate a second coolant to absorb heat from the refrigerant via a second heat exchanger and heat the passenger compartment.

The thermal storage medium may be any device capable of thermal storage. The thermal storage medium may, for example, be one of a Rechargeable Energy Storage System (RESS) housing the battery pack; an RESS housing power electronics; a phase change material positioned about and used as insulation around the battery pack; or a box of phase change material alone.

A method for providing heat to a vehicle passenger compartment is also provided. The method may include the steps of: storing heat in a thermal storage medium during an inactive state; and transferring heat from the thermal storage medium to the vehicle passenger compartment to heat the vehicle passenger compartment during active electric drive state, which includes cabin pre-conditioning prior to driving.

Transferring heat from the thermal storage medium to the vehicle passenger compartment may include the steps of: absorbing the heat stored in the thermal storage medium with a first coolant circulated through a first coolant circuit; exchanging heat between the first coolant and a refrigerant with a first heat exchanger; transferring heat from the refrigerant to a second coolant with a second heat exchanger, the second coolant circulated through a second coolant circuit; circulating the second coolant through a heater core; and transferring heat from the second coolant and the heater core to the air flowing across the heater core and into the vehicle passenger compartment to heat the vehicle passenger compartment.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

The following description and figures refer to example embodiments and are merely illustrative in nature and not intended to limit the invention, its application, or uses. Throughout the figures, some components are illustrated with standardized or basic symbols. These symbols are representative and illustrative only, and are in no way limiting to any specific configuration shown, to combinations between the different configurations shown, or to the claims. All descriptions of componentry are open-ended and any examples of components are non-exhaustive.

Referring to the figures, wherein like reference numbers correspond to like or similar components throughout the several views, a heat pump system 101 for use in a vehicle 100 to heat the passenger compartment 102 utilizing thermal storage is provided.

Figure 1:
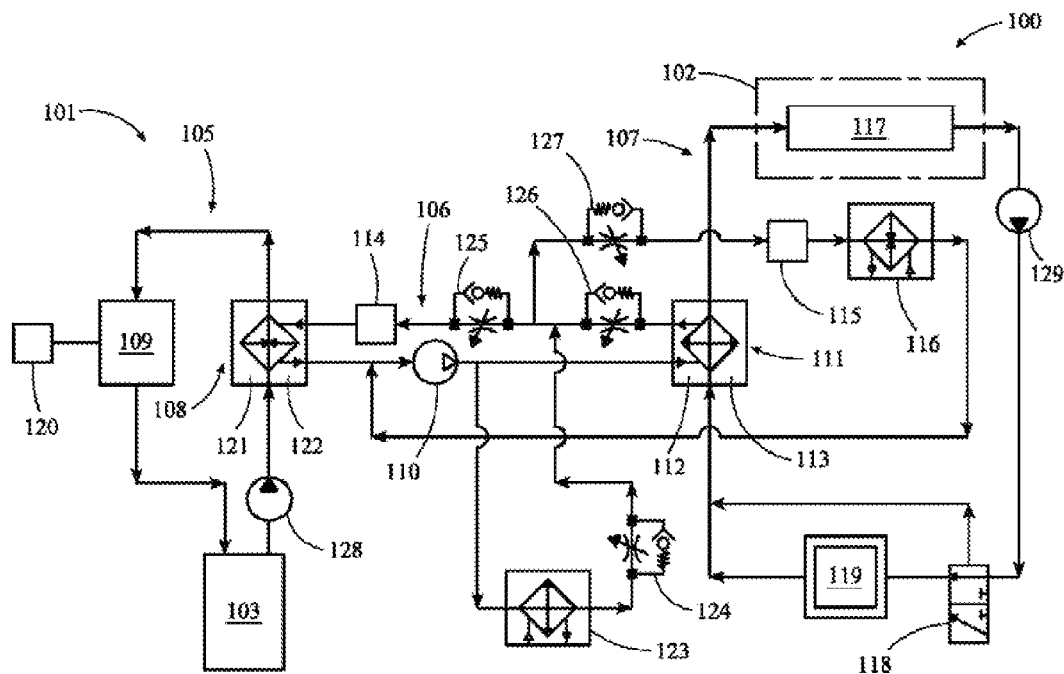
FIG. 1 is a schematic diagram of the vehicle heat pump system having a thermal storage medium.

Referring generally to FIG. 1, the vehicle 100 may include the heat pump system 101, the passenger compartment 102, an engine 119, and a battery pack 104. The vehicle 100 may be a hybrid or extended-range electric vehicle having a hybrid operating mode and an EV operating mode. In hybrid mode, the vehicle 100 operates using both electric power and power from the engine 119. In EV mode, the vehicle operates solely on electricity.

The vehicle 100 may have two states: an inactive state, wherein the vehicle 100 is turned off and wherein the electric power source of the vehicle 100 is being recharged or has reached a level of full electric charge, and an active drive state wherein the vehicle depletes the electric power sources to propel and drive the vehicle in EV mode. The electric power source may include a simple battery pack 104 or an RESS in conjunction with a high voltage battery 104, or another similar electrical power source.

The heat pump system 101 may include a thermal storage medium 103, a first coolant circuit 105, a refrigeration circuit 106, and a second coolant circuit 107. The thermal storage medium 103 may store heat during the inactive state. Heat stored in the thermal storage medium 103 may include waste heat from the battery pack 104 or heat actively added using a heater 109.

The heat pump system 101 may transfer the heat stored within the thermal storage medium 103 to the passenger compartment 102 of the vehicle 100 via the first coolant circuit 105, the refrigeration circuit 106, and the second coolant circuit 107 during the active drive state.

Referring specifically to FIG. 1, the first coolant circuit 105 may circulate a first coolant via a first coolant pump 128. The first coolant circuit 105 may include a heater 109, the thermal storage medium 103, and a first heat exchanger 108. The heater 109 may be configured to warm the first coolant and direct the first coolant through the thermal storage medium 103 to absorb the heat stored therein during the inactive state. The coolant may then be directed to the first heat exchanger 108.

The first heat exchanger 108 may include a first coolant cavity 121 and a refrigerant cavity 122. The first heat exchanger 108 may be configured to exchange heat between the first coolant flowing through the first coolant cavity 121 and the refrigerant, circulated by the refrigeration circuit 106, flowing through the first refrigerant cavity 122. The first heat exchanger 108 may be configured to exchange heat between the first coolant and a refrigerant circulated by the refrigeration circuit 106. The first heat exchanger 108 may be a chiller that may function as an evaporator to dissipate heat from the first coolant to the refrigerant.

The thermal storage medium 103 may be any device capable of thermal storage. The thermal storage medium 103 may, for example, be one of a Rechargeable Energy Storage System (RESS) housing the battery pack (shown as 104 in FIG. 2); an RESS housing power electronics; a phase change material positioned about and used as insulation around the battery pack (as shown in FIG. 3); or a phase change material alone.

Figure 2:
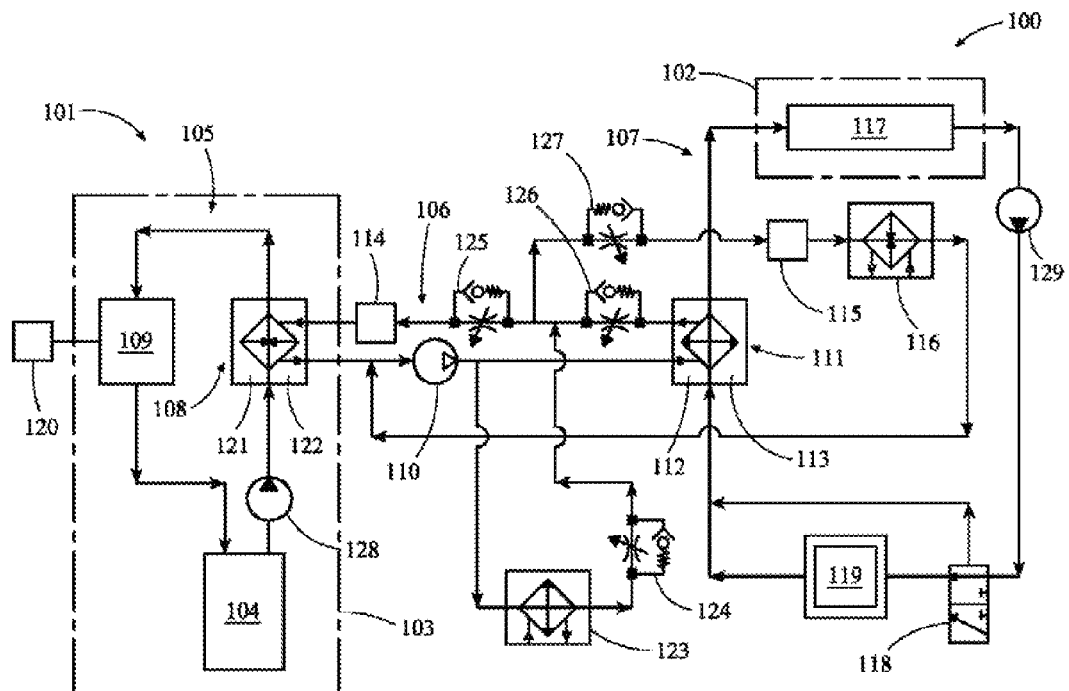
FIG. 2 is a schematic diagram of the vehicle heat pump system wherein the thermal storage medium is an RESS.

In one example embodiment shown in FIG. 2, the thermal storage medium 103 may be a Rechargeable Energy Storage System (RESS), which houses a liquid cooled battery 104. The liquid cooled battery 104 gives off a significant amount of heat in the inactive state. This heat may be stored within the thermal storage medium/RESS 103 and transferred to the vehicle passenger compartment 102, during the EV active drive state, to heat the passenger compartment 102. The heat stored in the thermal storage medium 103 may be transferred to the passenger compartment 102 via the first coolant circuit 105, which circulates a first coolant through the RESS 103 to absorb heat from the vehicle battery 104.

Figure 3:
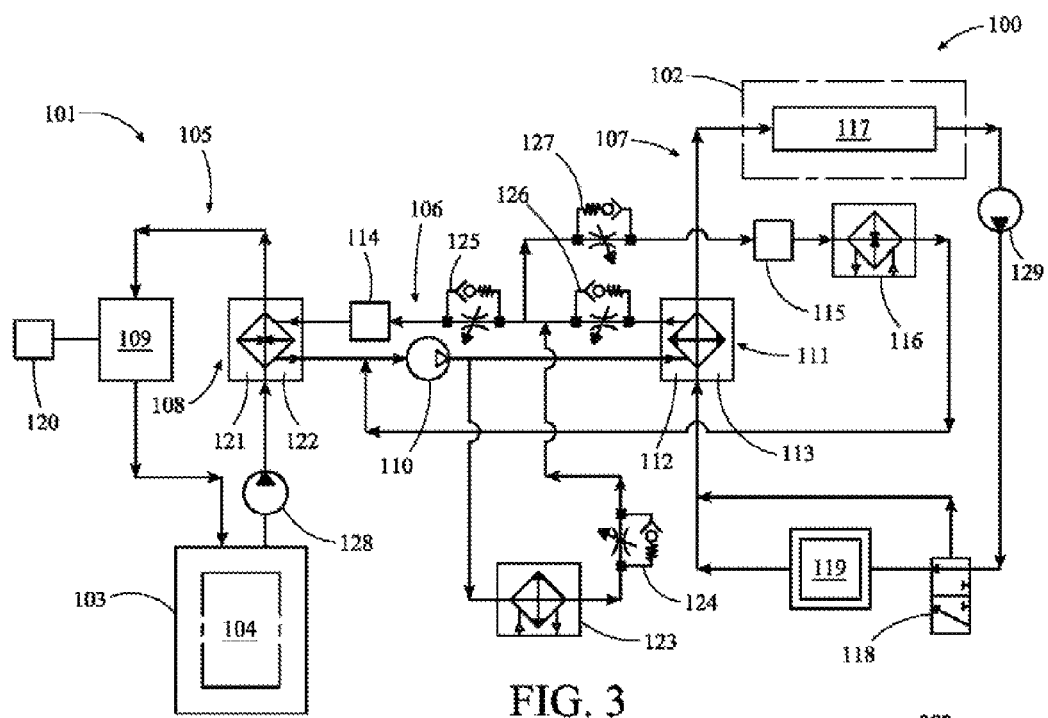
FIG. 3 is a schematic diagram of the vehicle heat pump system wherein the thermal storage medium is a phase change material.

In another example embodiment, shown in FIG. 3, the thermal storage medium 103 is a phase change material positioned about the vehicle battery 104. The phase change material may be one of an eutectic, salt hydrate, and other organic material such as waxes, oils, fatty acids and polyglycols or the like. The liquid cooled battery 104 gives off a significant amount of heat in the inactive state. This heat may be stored within the thermal storage medium/phase change material 103 and transferred to the vehicle passenger compartment 102 during the EV active drive state, to heat the passenger compartment 102. The heat stored in the thermal storage medium 103 may be transferred to the passenger compartment 102 via the first coolant circuit 105, which circulates a first coolant through the phase change material 103 to absorb heat therefrom.

Referring generally to FIGS. 1-3, the heat pump system further includes the refrigeration circuit 106 configured to circulate refrigerant and to dehumidify the passenger compartment 102 and the second coolant circuit 107 configured to circulate a second coolant to heat the passenger compartment 102.

The refrigeration circuit 106 may include a compressor 110, the first heat exchanger 108, a second heat exchanger 111, a first expansion device 114, a second expansion device 115, and a third heat exchanger 116.

The compressor 110 may be configured to compress the refrigerant. The compressor 110 may be driven by an electric motor (not shown), which may be of the single or variable speed variety. The compressor 110 may also be a pump driven by a belt connected to the propulsion system (not shown). The compressor 110 may be further configured to receive refrigerant gas from one of the first heat exchanger 108 and the third heat exchanger 116. The compressor 110 may pressurize the refrigerant gas into a high-pressure state and expel compressed refrigerant gas to the second heat exchanger 111.

The second heat exchanger 111 may include a refrigerant cavity 112 and a second coolant cavity 113. The second heat exchanger 111 may be a refrigerant-to-coolant heat pump condenser configured to cool and condense the refrigerant and exchange heat between the refrigerant flowing through the refrigerant cavity 112 and the second coolant flowing through the second coolant cavity 113. The second heat exchanger 111 may receive refrigerant from the compressor 110 and the second coolant from one of a bypass valve 118 and an engine 119. The second heat exchanger 111 may extract heat from the pressurized refrigerant gas as it flows through the refrigerant cavity 112 to the extent that the pressurized refrigerant gas is cooled and condensed to a point at which it is reclaimed into a liquid state. The heat extracted from the refrigerant as it flows through the second refrigerant cavity 112 may be transferred to the second coolant flowing through the second coolant cavity 113.

The second heat exchanger 111 may be further configured to expel refrigerant from the refrigerant cavity 112 through the refrigeration circuit 106 to one of the first expansion device 114 and the second expansion device 115. The second heat exchanger 111 may also be configured to expel the second coolant from the second coolant cavity 113 to a coolant heater core 117 within the second coolant circuit 107 as described herein below.

In the event that the passenger compartment 102 requires cooling rather than heating, the refrigeration circuit 106 may also include a fourth heat exchanger 123, to be utilized in lieu of the second heat exchanger 111. The fourth heat exchanger 123 may be a refrigerant-to-air condenser. The fourth heat exchanger 123 may receive pressurized refrigerant gas from the compressor 110 and may cool and condense the pressurized refrigerant gas as it flows therethrough, to the extent that the pressurized refrigerant gas is cooled and condensed to a point at which it is reclaimed into a liquid state. In such an instance, the fourth heat exchanger 123 may expel refrigerant to one of the first expansion device 114 and the second expansion device 115.

The first expansion device 114 and the second expansion device 115 of the refrigeration circuit 106 may be configured to receive refrigerant from the refrigerant cavity 112 of the second heat exchanger 111 and be further configured to allow the refrigerant to cool and expand. The first and second expansion devices 114, 115 may allow the high pressure liquid refrigerant to expand, reducing the pressure of the refrigerant as it exits the first and second expansion devices 114, 115. The first and second expansion devices 114, 115 may be further configured to control and selectively distribute refrigerant to each of the respective first heat exchanger 108 functioning as a heat pump evaporator and the third heat exchanger 116 acting as a compartment evaporator, at a significantly reduced pressure. The first and second expansion devices 114, 115 may be thermostatic or thermal expansion valves, and may be configured to hold a constant evaporator superheat state as the refrigerant enters one of the first heat exchanger 108 and the third heat exchanger 116. Each of the respective first expansion device 114 and second expansion device 115 may be either electronic or mechanical. The first and second expansion devices 114, 115 may monitor, such as with a sensor or a bulb, the temperature of the refrigerant leaving either the first heat exchanger 108 and the third heat exchanger 116, and may improve the performance of the heat exchange by letting additional or less refrigerant into the first and third heat exchangers 108, 116.

When heating of the passenger compartment is required, the first expansion device 114 may be configured to receive refrigerant from the refrigerant cavity 112 of the second heat exchanger 111 and allow the refrigerant to cool and expand. If cooling of the passenger compartment 102 is required, the first expansion device 114 may be configured to receive refrigerant from the fourth heat exchanger 123 and allow the refrigerant to cool and expand.

The first expansion device 114 may be further configured to expel refrigerant to the refrigerant cavity 122 of the first heat exchanger 108. The first heat exchanger 108 configured to exchange heat between the first coolant and a refrigerant circulated by the refrigeration circuit 106 and expel the refrigerant back to the compressor 110 to complete the refrigeration circuit 106.

When heating of the passenger compartment is required, the second expansion device 115 may be configured to receive refrigerant from the refrigerant cavity 112 of the second heat exchanger 111 and allow the refrigerant to cool and expand. If cooling of the passenger compartment is required, the second expansion device 115 may be configured to receive refrigerant from the fourth heat exchanger 123 and allow the refrigerant to cool and expand.

The second expansion device 115 may be further configured to expel refrigerant to the third heat exchanger 116, acting as a compartment evaporator.

The third heat exchanger 116 may be configured to exchange heat from the refrigerant flowing through the third heat exchanger 116 to the air flowing across the third heat exchanger 116 and into the passenger compartment 102 to cool and dehumidify the passenger compartment 102. The third heat exchanger 116 may be further configured to receive refrigerant from the second expansion device 115 and expel refrigerant back to the compressor 110 to complete the refrigeration circuit 106.

The refrigeration circuit may also include a plurality of flow control valves 124, 125, 126, 127 to control the flow of and selectively distribute refrigerant throughout the refrigeration circuit 106 of the heat pump system 101 based on the heating, cooling, and dehumidification requirements of the passenger compartment 102.

The second coolant circuit 107 may circulate a second coolant via a second coolant pump 129. The second coolant circuit 107 may include a heater core 117, the second heat exchanger 111, a bypass valve 118, and the vehicle engine 119.

The second heat exchanger 111 may include the refrigerant cavity 112 and the second coolant cavity 113 as described herein above. The second heat exchanger 111 may be a refrigerant-to-coolant heat pump condenser configured to cool and condense the refrigerant and exchange heat between the refrigerant flowing through the refrigerant cavity 112 and the second coolant flowing through the second coolant cavity 113. The second heat exchanger 111 may receive refrigerant from the compressor 110 within the refrigerant loop 106 and the second coolant from one of a bypass valve 118 and an engine 119 within the second coolant circuit 107. The bypass valve 118, may be a three-way, two-position valve and may be configured to direct flow of the second coolant from the second heat exchanger 111 to one of the second heat exchanger 111 and the vehicle engine 119. In EV mode the bypass valve 118 will direct coolant flow to bypass the engine 119 and expel the second coolant directly to the second heat exchanger 111 to warm the passenger compartment 102. In hybrid mode, the bypass valve 118 may direct all flow of the second coolant to the vehicle engine 119, to utilize engine waste heat to heat the passenger compartment 102 wherein the engine 119 will then expel warmed second coolant to the second heat exchanger 111 to warm the passenger compartment 102.

The second heat exchanger 111 may further extract heat from the pressurized refrigerant gas as it flows through the refrigerant cavity 112 to the extent that the pressurized refrigerant gas is cooled and condensed to a point at which it is reclaimed into a liquid state. The heat extracted from the refrigerant as it flows through the refrigerant cavity 112 may be transferred to the second coolant flowing through the second coolant cavity 113.

The second heat exchanger 111 may be further configured to expel the second coolant from the second coolant cavity 113 to the coolant heater core 117.

The coolant heater core 117 may be configured to receive the second coolant from the second heat exchanger 111. The heater core 117 may be further configured to heat air flowing across and dehumidified by the third heat exchanger 116. The heater core 117 may warm the air flowing thereacross and into the passenger compartment 102 with the warmed second coolant flowing therethrough, to heat the passenger compartment 102.

After the air flowing across the heater core 117 is heated thereby via the warmed second coolant, the heat pump system 101 has effectively transferred the heat stored in the thermal storage medium 103 to the first coolant flowing through the first coolant circuit 105, to the refrigerant flowing through the refrigerant circuit 106, to the second coolant flowing through the second coolant circuit 107, and finally to the passenger compartment 102, to warm the passenger compartment 102.

As shown in FIGS. 1-3, the first coolant circuit 105, the refrigeration circuit 106, and the second coolant circuit 107 may be controlled by at least one control module 120, which may be configured to communicate with the first coolant pump 128, the compressor 110, and the second coolant pump 129. The at least one control module 120 may further be configured to communicate with the first expansion device 114 and the second expansion device 115; the plurality of flow control valves 124, 125, 126, 127; and other subsystems through at least one electrical connection.

Utilizing thermal storage within the thermal storage medium 103 to heat the vehicle passenger compartment 102 allows hybrid and extended-range electric vehicles to operate more efficiently in EV mode in colder ambient temperatures because the vehicle will utilize this stored energy rather than requiring the engine 119 to burn gasoline or fuel to heat the passenger compartment 102 in cold ambient temperatures. Additionally, utilizing the heat pump system 101 which has the capabilities to transfer and utilize heat stored in a thermal storage medium 103 to heat the passenger compartment 102, allows hybrid and extended-range electric vehicles to operate in heat pump mode in extremely cold ambient temperatures as low as −40° C.

Figure 4:
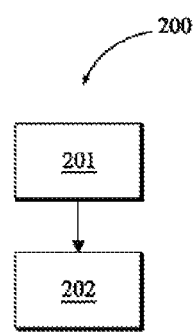
FIG. 4 is a flow chart depicting the steps of the method of providing heat to a vehicle passenger compartment in Electric Vehicle (EV) Mode.
Figure 5:
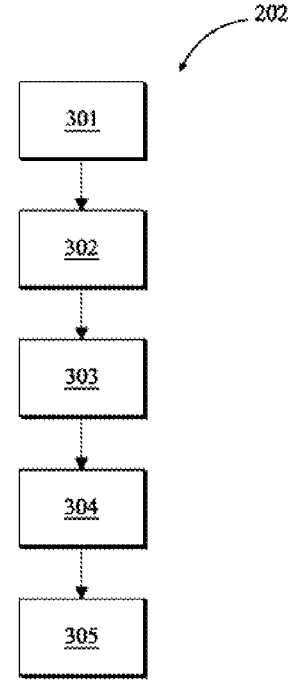
FIG. 5 is a flow chart detailing the steps necessary to transfer heat from the thermal storage medium to the vehicle passenger compartment.

Referring to FIGS. 4 and 5, a method for providing heat to a vehicle passenger compartment 102 is also provided in conjunction with the structure of the example vehicle 100 shown in FIGS. 1 and 2. The present method (shown in flow chart form at 200) may be beneficially used to heat a passenger compartment 102 of a vehicle 100 having an active electric drive state and an inactive state.

The method may include the steps 201 and 202 shown in FIG. 4. At step 201, the heat pump system 101 stores heat in a thermal storage medium 103 during the inactive state. The thermal storage medium 103 may be a Rechargeable Energy Storage System (RESS), which houses a liquid cooled battery 104. The liquid cooled battery 104 gives off a significant amount of heat during the inactive state and/or heat actively added to the battery using a heater 109. The thermal storage medium 103 may also be a phase change material positioned about the vehicle battery 104 and capable of absorbing the heat given off by the battery 104 during the inactive state.

At step 202, the heat pump system 101 may transfer heat from the thermal storage medium 103 to the vehicle passenger compartment 102 during the active electric drive state in EV mode. Heat is transferred via the first coolant circuit 105, the refrigeration circuit 106, and the second coolant circuit 107.

Step 202, transferring heat from the thermal storage medium 103 to the vehicle passenger compartment 102, may include several sub-steps 301-305, shown in FIG. 5.

At step 301, the first coolant circuit 105 circulates a first coolant through the thermal storage medium 103 to allow the first coolant to absorb the heat stored within the thermal storage medium 103. The first coolant is then directed from the thermal storage medium 103 to the first heat exchanger 108.

At step 302, the first heat exchanger 108 absorbs and exchanges the heat from the thermal storage medium 103 to the first coolant and from the first coolant to a refrigerant being circulated through the refrigeration circuit 106. The refrigerant is then directed though the refrigeration circuit 106 and on to the second heat exchanger 111.

At step 303, the second heat exchanger 111 exchanges the heat from the thermal storage medium 103 now present in the refrigerant to the second coolant being circulated through a second coolant circuit 107.

At step 304, the second coolant is then directed though the second coolant circuit 107 and on to the heater core 117.

At step 305, the heat stored by the thermal storage medium 103 is transferred from the second coolant and the heater core 117 to the air flowing across the heater core 117 and into the vehicle passenger compartment 102, to heat the vehicle passenger compartment 102.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A heat pump system for use in a vehicle having a passenger compartment for receiving conditioned air, an engine, and a rechargeable vehicle battery, the system comprising:
   a first coolant circuit configured to circulate a first coolant, the first coolant circuit including:
      a heater configured to heat the first coolant;
      a thermal storage medium positioned about and immediately surrounding the rechargeable vehicle battery, the thermal storage medium configured to receive and store heat produced by charging the rechargeable vehicle battery, such that the first coolant absorbs the heat stored in the thermal storage medium, wherein the thermal storage medium is a phase change material; and
      a first heat exchanger having a first coolant cavity and a refrigerant cavity, such that the first coolant is configured to circulate through the first coolant cavity;
   a refrigeration circuit in heat exchange relation with the first coolant circuit via the first heat exchanger, the refrigeration circuit further configured to circulate a refrigerant through the refrigerant cavity of the first heat exchanger, such that the refrigerant is configured to absorb stored heat from the first coolant circulating within the first coolant circuit and further configured to condition the air to be received by the passenger compartment;
   a second coolant circuit configured to circulate a second coolant, the second coolant circuit in heat exchange relation with the refrigerant circuit via a second heat exchanger, wherein the second heat exchanger includes a refrigerant cavity and a coolant cavity, and the second heat exchanger is configured to exchange heat between the refrigerant flowing through the refrigerant cavity of the second heat exchanger and the second coolant flowing through the coolant cavity of the second heat exchanger, such that the heat absorbed by the refrigerant within the refrigeration circuit from the first coolant within the first coolant circuit is transferred to the second coolant within the second coolant circuit via the second heat exchanger; and
   wherein the heat stored in the thermal storage medium is transferred to the conditioned air received by the passenger compartment via the first coolant circuit, the refrigeration circuit, and the second coolant circuit.

2. The heat pump system of claim 1 wherein the vehicle has one of an active drive state and an inactive state.

3. The heat pump system of claim 2 wherein the thermal storage medium is configured to receive and store heat produced by charging the rechargeable vehicle battery during the inactive state; and wherein the heat stored in the thermal storage medium during the inactive state is transferred to the vehicle passenger compartment via the first coolant circuit, the refrigeration circuit, and the second coolant circuit during the active drive state.

4. The heat pump system of claim 1 wherein the phase change material has a thermal capacity exchangeable with a fluid medium.

5. The heat pump system of claim 1 wherein the phase change material is selected from a group consisting of an eutectic, salt hydrate, and organic material.

6. The heat pump system of claim 1 wherein the rechargeable vehicle battery has an outermost perimeter, and wherein the phase change material is positioned about the outermost perimeter, such that the phase change material immediately surrounds the entirety of the outermost perimeter.

7. The heat pump system of claim 1 wherein the refrigeration circuit includes:
   a compressor configured to compress the refrigerant; and
   the second heat exchanger configured to exchange heat between the refrigerant flowing through the refrigerant cavity of the second heat exchanger and the second coolant flowing through the coolant cavity of the second heat exchanger.

8. The heat pump system of claim 7 wherein the refrigeration circuit further includes:
   a first expansion device configured to receive refrigerant from the refrigerant cavity of the second heat exchanger and further configured to allow the refrigerant to cool and expand; and
   the first heat exchanger configured to receive refrigerant from the first expansion device and expel refrigerant to the compressor, the first heat exchanger further configured to exchange heat between the refrigerant and the first coolant.

9. The heat pump system of claim 7 wherein the refrigeration circuit further includes:
   a second expansion device configured to receive refrigerant from the refrigerant cavity of the second heat exchanger and further configured to allow the refrigerant to cool and expand; and
   a third heat exchanger configured to receive refrigerant from the second expansion device and expel refrigerant to the compressor, the third heat exchanger further configured to exchange heat from the refrigerant to the air flowing across the third heat exchanger and to the passenger compartment to cool and dehumidify the passenger compartment.

10. The heat pump system of claim 1 wherein the second coolant circuit further includes:
    a heater core configured to heat air flowing across the heater core and into the passenger compartment; and
    a bypass valve configured to receive the second coolant from the coolant heater core and further configured to direct the second coolant to one of the second heat exchanger and the engine.

11. The heat pump system of claim 10 wherein the bypass valve directs refrigerant to the second heat exchanger to bypass the engine.

12. The heat pump system of claim 10 wherein the bypass valve directs the second coolant to the engine.

13. A method of heating a vehicle passenger compartment comprising the steps of:
    providing a heat pump system for use in a vehicle having rechargeable vehicle battery, wherein the heat pump system includes:
        a first coolant circuit configured to circulate a first coolant, the first coolant circuit including:
            a heater configured to heat the first coolant;
            a thermal storage medium positioned about and immediately surrounding the rechargeable vehicle battery, the thermal storage medium configured to receive and store heat produced by charging the rechargeable vehicle battery, such that the first coolant absorbs the heat stored in the thermal storage medium, wherein the thermal storage medium is a phase change material; and
            a first heat exchanger having a first coolant cavity and a refrigerant cavity, such that the first coolant is configured to circulate through the first coolant cavity;
        a refrigeration circuit in heat exchange relation with the first coolant circuit via the first heat exchanger, the refrigeration circuit further configured to circulate a refrigerant through the refrigerant cavity of the first heat exchanger; and
        a second coolant circuit configured to circulate a second coolant, the second coolant circuit in heat exchange relation with the refrigeration circuit via a second heat exchanger, wherein the second heat exchanger includes a refrigerant cavity and a coolant cavity, and the second heat exchanger is configured to exchange heat between the refrigerant flowing through the refrigerant cavity of the second heat exchanger and the second coolant flowing through the coolant cavity of the second heat exchanger;
    storing heat in the thermal storage medium during a vehicle charge event; and
    transferring the heat stored in the thermal storage medium from the thermal storage medium to the vehicle passenger compartment to heat the vehicle passenger compartment via the first coolant circuit, the second coolant circuit, and the refrigeration circuit.

14. The method of claim 13 wherein transferring the heat stored in the thermal storage medium from the thermal storage medium to the vehicle passenger compartment via the first coolant circuit, the second coolant circuit, and the refrigeration circuit, includes the steps of:
    absorbing the heat stored in the thermal storage medium with the first coolant circulating through the first coolant circuit;
    exchanging heat between the first coolant and the refrigerant flowing through the refrigeration circuit with the first heat exchanger;
    transferring heat from the refrigerant flowing through the refrigeration circuit to the second coolant flowing through the second coolant circuit with the second heat exchanger;
    circulating the second coolant through a heater core; and
    transferring heat from the second coolant and the heater core to the air flowing across the heater core and into the vehicle passenger compartment to heat the vehicle passenger compartment.

15. The method of claim 14 wherein the vehicle has an active electric drive state and an inactive electric charging state;
    wherein the vehicle charge event occurs during the inactive electric charging state, such that heat is transferred to and stored in the thermal storage medium during the inactive electric charging state; and
    wherein the heat stored in the thermal storage medium is transferred from the thermal storage medium to the vehicle passenger compartment via the first coolant circuit, the second coolant circuit, and the refrigeration circuit during the active electric drive state.

16. The method of claim 13 wherein the phase change material is selected from a group consisting of an eutectic, salt hydrate, and organic material.

17. The method of claim 13 wherein the rechargeable vehicle battery has an outermost perimeter, and wherein the phase change material is positioned about the outermost perimeter, such that the phase change material surrounds the entirety of the outermost perimeter.

* * * * *